(12) United States Patent
Moore et al.

(10) Patent No.: US 7,566,747 B2
(45) Date of Patent: Jul. 28, 2009

(54) WAX PARTICLES FOR PROTECTION OF ACTIVATORS, AND MULTIFUNCTIONAL AUTONOMICALLY HEALING COMPOSITE MATERIALS

(75) Inventors: Jeffrey S. Moore, Savoy, IL (US); Joseph D. Rule, Urbana, IL (US); Scott R. White, Champaign, IL (US); Nancy R. Sottos, Champaign, IL (US); Eric N. Brown, Los Alamos, NM (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 350 days.

(21) Appl. No.: 10/840,937

(22) Filed: May 7, 2004

(65) Prior Publication Data

US 2005/0250878 A1    Nov. 10, 2005

(51) Int. Cl.
*C08K 9/10* (2006.01)
(52) U.S. Cl. .................. 523/205; 523/200; 523/210; 523/211
(58) Field of Classification Search .................. 523/211
See application file for complete search history.

(56) References Cited

U.S. PATENT DOCUMENTS

| | | |
|---|---|---|
| 3,041,289 A | 6/1962 | Katchen et al. |
| 3,069,370 A | 12/1962 | Jensen et al. |
| 3,868,199 A | 2/1975 | Fera |
| 4,080,238 A | 3/1978 | Wolinski et al. |
| 4,301,306 A | 11/1981 | Layer |
| 4,324,717 A | 4/1982 | Layer |
| 4,380,617 A | 4/1983 | Minchak et al. |
| 4,389,496 A | 6/1983 | Leüsner et al. |
| 4,461,854 A | 7/1984 | Smith |
| 4,708,969 A | 11/1987 | Leach |
| 4,755,588 A | 7/1988 | Vallance et al. |
| 4,758,400 A | 7/1988 | Dunnavant et al. |
| 4,804,427 A | 2/1989 | Paul et al. |
| 4,853,434 A | 8/1989 | Block |
| 4,902,560 A | 2/1990 | Silver |
| 4,940,645 A | 7/1990 | Davis et al. |
| 4,943,621 A | 7/1990 | Janda et al. |
| 5,063,103 A | 11/1991 | Sugawara et al. |
| 5,185,108 A | 2/1993 | Shimandle |
| 5,312,940 A | 5/1994 | Grubbs et al. |
| 5,324,616 A | 6/1994 | Sacripante et al. |
| 5,342,909 A | 8/1994 | Grubbs et al. |
| 5,413,924 A | 5/1995 | Kosak et al. |
| 5,427,880 A | 6/1995 | Tamura et al. |
| 5,504,176 A | 4/1996 | Fujiki |
| 5,550,044 A | 8/1996 | Kosak et al. |
| 5,561,173 A | 10/1996 | Dry |
| 5,575,841 A | 11/1996 | Dry |
| 5,643,764 A | 7/1997 | Kosak et al. |
| 5,660,624 A | 8/1997 | Dry |
| 5,789,494 A | 8/1998 | Hand et al. |
| 5,801,033 A | 9/1998 | Hubbell et al. |
| 5,803,963 A | 9/1998 | Dry |
| 5,840,238 A | 11/1998 | Setiabudi et al. |
| 5,958,325 A | 9/1999 | Seemann, III et al. |
| 5,989,334 A | 11/1999 | Dry |
| 6,001,909 A | 12/1999 | Setiabudi |
| 6,040,363 A | 3/2000 | Warner et al. |
| 6,048,488 A | 4/2000 | Fink et al. |
| 6,075,072 A | 6/2000 | Guilbert et al. |
| 6,100,323 A | 8/2000 | Setiabudi et al. |
| 6,113,728 A | 9/2000 | Tsukagoshi et al. |
| 6,224,793 B1 | 5/2001 | Hoffman et al. |
| 6,258,870 B1 | 7/2001 | Hubbell et al. |
| 6,261,360 B1 | 7/2001 | Dry |
| 6,287,992 B1 | 9/2001 | Polansky et al. |
| 6,316,194 B1 | 11/2001 | Karn et al. |
| 6,388,865 B1 | 5/2002 | Honda et al. |
| 6,479,167 B2 | 11/2002 | Sumita et al. |
| 6,518,330 B2 | 2/2003 | White et al. |
| 6,527,849 B2 | 3/2003 | Dry |
| 6,669,961 B2 | 12/2003 | Kim et al. |
| 6,858,659 B2 | 2/2005 | White et al. |
| 7,022,179 B1 | 4/2006 | Dry |
| 7,045,562 B2 * | 5/2006 | Thiel ..................... 523/205 |
| 7,192,993 B1 | 3/2007 | Sarangapani et al. |

(Continued)

FOREIGN PATENT DOCUMENTS

DE    42 09 031    9/1993

(Continued)

OTHER PUBLICATIONS

Bazan, G.C., et al., "Polymerization of Functionalized of Norbornenes Employing Mo(CH-t-Bu) (NAr) (O-t-Bu)$_2$ as the Initiator", Macromolecules, (1991), 24: 4495-4502.

(Continued)

*Primary Examiner*—Vickey Nerangis
(74) *Attorney, Agent, or Firm*—Blanchard & Associates

(57) ABSTRACT

A composite material comprises (i) a polymer, (ii) a polymerizer, (iii) a protected corresponding activator for the polymerizer, and (iv) a plurality of capsules. The polymerizer is in the capsules, and the corresponding activator is protected with a corresponding encapsulant for the polymer and the polymerizer.

3 Claims, 4 Drawing Sheets

U.S. PATENT DOCUMENTS

| | | | |
|---|---|---|---|
| 7,276,252 | B2 | 10/2007 | Payumo et al. |
| 2002/0007959 | A1 | 1/2002 | Kaltenborn et al. |
| 2002/0111434 | A1 | 8/2002 | White et al. |
| 2003/0013551 | A1 | 1/2003 | Harris et al. |
| 2004/0007784 | A1 | 1/2004 | Skipor et al. |
| 2004/0055686 | A1 | 3/2004 | Cowger et al. |
| 2005/0038173 | A1 | 2/2005 | Harris et al. |
| 2005/0085564 | A1 | 4/2005 | Thiel |
| 2006/0111469 | A1 | 5/2006 | White et al. |
| 2006/0252852 | A1 | 11/2006 | Braun et al. |
| 2006/0281834 | A1 | 12/2006 | Lee et al. |
| 2007/0166542 | A1 | 7/2007 | Braun et al. |
| 2007/0282059 | A1 | 12/2007 | Keller et al. |

FOREIGN PATENT DOCUMENTS

| | | |
|---|---|---|
| DE | 10157123 | 1/2003 |
| EP | 0020123 | 12/1980 |
| EP | 0287288 | 10/1988 |
| EP | 0 349 855 | 1/1990 |
| EP | 0 424 833 | 5/1991 |
| EP | 0 669 368 | 8/1995 |
| EP | 0985737 | 3/2000 |
| WO | WO 90/00005 | 1/1990 |
| WO | WO 93/20111 | 10/1993 |
| WO | WO 96/16100 | 5/1996 |
| WO | WO 96/20235 | 7/1996 |
| WO | WO 97/25360 | 7/1997 |
| WO | WO 99/55753 | 11/1999 |
| WO | WO 99/55794 | 11/1999 |
| WO | WO 02/064653 | 8/2002 |
| WO | WO 2004/035644 | 4/2004 |
| WO | WO 2005/118703 | 12/2005 |
| WO | WO 2007/009280 | 1/2007 |
| WO | WO 2007/082153 | 7/2007 |

OTHER PUBLICATIONS

Brown, E.N., et al., "Microcapsule Induced Toughening In a Self-Healing Polymer Composite", J. Mater. Sci. (2004), 39: 1703-1710.
Brown, E.N., et al., "In Situ Poly(Urea-Formaldehyde) Microencapsulation of Dicyclopentadiene", J. Microencapsulation. (2003), 20: 719-730.
Brown, E.N., et al., "Fracture Testing of a Self-Healing Polymer Composite", Exp. Mech. (2002), 42: 372-379.
Grubbs, R.H., et al., "Recent Advances in Olefin Metathesis and Its Application in Organic Synthesis", Tetrahedron, (1998), 54: 4413-4450.
Kessler, M.R., et al., "Cure Kinetics of the Ring-Opening Metathesis Polymerization of Dicyclopentadiene", Polym. Sci. Pol. Chem. (2002), 40: 2373-2383.
Kessler, M.R., et al., "Self-Healing Structural Composite Materials", Compos. Part A-Appl. S. (2003), 34: 743-753.
Mostovoy, S., et al., "Use of Crack-Line Specimens for Measuring Plane-Strain Fracture Toughness", J. Mater. Sci. (1967), 2: 661-681.
Rule, J.D., et al., "ROMP Reactivity of Endo- and Exo-Dicyclopentadiene", Macromolecules, (2002), 35: 7878-7882.
Schwab, P., et al., "Synthesis and Applications of RuCl$_2$(=CHR') (PR$_3$)$_2$: The Influence of the Alkylidene Moiety on Metathesis Activity", J. Am. Chem, Soc. (1996), 118: 100-110.
Stevens, M.P., Polymer Chemistry: An Introduction, 3$^{rd}$ Edition, New York: Oxford University Press, 1999, pp. 184-186.
Stevens, M.P., Polymer Chemistry: An Introduction, 3$^{rd}$ Edition, New York: Oxford University Press, 1999, pp. 378-381.
Taber, D.F., et al., "Grubbs' Catalyst in Paraffin: An Air-Stable Preparation for Alkene Metathesis", J. Org. Chem. (2003), 68: 6047-6048.
White, S.R., et al., "Autonomic Healing of Polymer Composites", Nature, (2001), 409: 794-797 with correction.
Wool, R.P., et al., "A Theory of Crack Healing in Polymers", J. Appl. Phys. (1981), 52: 5953-5963.
International Search Report dated Nov. 9, 2005 for corresponding PCT application No. PCT/US2005/015783.
Dry, C., et al., "Three part methylmethacrylate adhesive system as an internal delivery system for smart responsive concrete", Smart Mater. Struct., 5, p. 297-300, 1996.
Dry, C. "Matrix cracking repair and filling using active and passive modes for smart time release of chemicals from fibers into cement matrices", Smart Mater. Struct., 3, p. 118-123, 1994.
Dry, C., "Procedures developed for self-repair of polymer matrix composite materials", Composite Structures, 35, p. 263-269, 1996.
Dry, C. et al., "Passive smart self-repair in polymer matrix composite materials", SPIE, vol. 1916, p. 438-444, 1993.
Beckwith, et al., "Resin Transfer Molding: A Decade of Technology Advances", SAMPE Journal, vol. 34, No. 6, p. 7-19, 1998.
Dias, E.L., et al., "Well-Defined Ruthenium Olefin Metathesis Catalyst: Mechanism and Activity", J. Am. Chem. Soc., 119, p. 3887-3897, 1997.
Breslow, D.S., "Metathesis Polymerization", Prog. Polym. Sci. vol. 18, p. 1141-1195, 1993.
Dias, E.L., et al., "Synthesis and Investigation of Homo- and Heterobimetallic Ruthenium Olefin Metathesis Catalysts Exhibiting Increased Activities", Organometallics, 17, p. 2758-2767, 1998.
Weck, M., et al., "Synthesis of Discotic Columnar Side-Chain Liquid Crystalline Polymers by Ring-Opening Metathesis Polymerization (ROMP)", Macromolecules, 30, p. 6430-6437, 1997.
Fraser, C., et al., "Synthesis of Glycopolymers of Controlled Molecular Weight by Ring-Opening Metathesis Polymerization Using Well-Defined Functional Group Tolerant Ruthenium Carbene Catalysts", Macromolecules, 28, p. 7248-7255, 1995.
Li, Victor C., et al., "Feasibility Study of a Passive Smart Self-healing cementitious composite.", Composites Part B, 29B, p. 819-827, 1998.
International Search Report dated Oct. 4, 2002 for Application No. PCT/US02/04163.
Dean, K., "Near-Infrared and Rheological Investigations of Epoxy-Vinyl Ester Interpenetrating Polymer Networks", Macromolecules, p. 6623-6630, 2001.
Wool, Richard P., "A material fix", Nature, vol. 409, p. 773-774.
Epon, Resin 160 Epoxy Novolac Resin, Product Bulletin, p. 1-3, 1998.
D. Jung, et al., "Self-healing composites using embedded microspheres", K. Jacob, N. Katsube and W. Jones, ed., vol. MD-80, The American Society for Mechanical Engineers (ASME), 265-275 (1997).
Holden, G. "Elastomers, Thermoplastic" Encyclopedia of Polymer Science and Technology, John Wiley & Sons, 1-25, 2002.
Cho, S.H., "Polydimethylsiloxane-Based Self-Healing Materials", Advanced Materials, vol. 18, Issue 8, 997-100, Apr. 7, 2006.
International Search Report dated Aug. 1, 2006 for PCT application No. PCT/US2006/015703.
Rzeszutko, A.A. et al., "Tensile properties of self-healing epoxy", TAM Technical Reports—1041: Proceedings of the Fifth Undergraduate Research Conference in Mechanics, pp. 27-33, (2004).
Sudduth, R.D., "Analysis of the maximum tensile strength of a composite with spherical particulates", Journal of Composite Materials, vol. 40, No. 4, pp. 301-331, (2006); published on-line (2005).
Tvergaard, V., "Effect of ductile particle debonding during crack bridging in ceramics", International Journal of Mechanical Sciences, vol. 34, No. 8, pp. 635-649, (1992).
Zhang, X.X. et al., "Fabrication and properties of microcapsules and nanocapsules containing n-octadecane", Materials Chemistry and Physics, vol. 88, pp. 300-307, (2004).
Blaiszik, B.J. et al., "Nanocapsules for self-healing composites", Proceedings of the SEM annual meeting on experimental and applied mechanics, Society for Experimental Mechanics, St. Louis, MO, 6 pages, Jun. 4-7, 2006.
Crook, D.C., "Spectroscopic identification of protective and non-protective corrosion coatings on steel structures in marine environments", Corrosion Science, vol. 47, pp. 2550-2570, (2005).
Wessling, B., "Scientific engineering of anti-corrosion coating systems based on organic metals (polyaniline)", Journal of Corrosion Science and Engineering, vol. 1, paper 15, 19 pages, found at www.jcse.org, ISSN 1466-8858, (1999).
Cho, S.H., et al., "Polydimethylsiloxane-based self-healing materials", Advanced Materials, vol. 18, issue 8, pp. 997-1000, (2006).

Asua, J.M., "Miniemulsion Polymerization", Prog. Polymer Science, vol. 27, pp. 1283-1346, (2002).

Schork, F.J., "Miniemulsion Polymerization", Adv. Polym. Sci., vol. 175, pp. 129-255, (2005).

Alexandridou, S. et al., "Surface characterization of oil-containing polyterephthalamide microcapsules prepared by interfacial polymerization", J. Microencapsulation, vol. 18, No. 6, pp. 767-781, (2001).

IUPAC, "emulsion", Compendium of Chemical Terminology: IUPAC Recommendations, 2nd Edition, compiled by A.D. McNaught and A. Wilkinson, Blackwell, Oxford, (1997).

Lansalot, M. et al., "RAFT miniemulsion polymerization: Influence of the structure of the RAFT agent", Macromolecules, vol. 35, No. 20, pp. 7582-7591, (2002).

Ni, P. et al., "Effect of operating variables and monomers on the formation of polyurea microcapsules", Journal of Membrane Science, vol. 103, pp. 51-55, (1995).

Ramirez, L.P. et al.,"Magnetic polystyrene nanoparticles with a high magnetite content obtained by miniemulsion processes", Macromolecular Chemistry and Physics, vol. 204, No. 1, pp. 22-31, (2003).

Tiarks, F. et al., "Preparation of polymeric nanocapsules by miniemulsion polymerization", Langmuir, vol. 17, No. 3, pp. 908-918, (2001).

IUPAC, "emulsion", Compendium of Chemical Terminology: IUPAC Recommendations, 2nd Edition, compiled by A.D. McNaught and A. Wilkinson, Blackwell, Oxford, 1 page, (1997).

Keller, M.W. et al., "An elastomeric self-healing material", Proceedings of the 2006 SEM Annual Conference and Exposition on Experimental and Applied Mechanics 2006, vol. 1, pp. 379-382, (2006).

Pickering, S.U., "Emulsions", Journal of the Chemical Society, Transactions, vol. 91, pp. 2001-2021, (1907).

Finkle, P. et al., "The theory of emulsification", Journal of the American Chemical Society, vol. 45, No. 12, pp. 2780-2788, (1923).

Pieranski, P. "Two-dimensional interfacial colloidal crystals", Physical Review Letters, vol. 45, No. 7, pp. 569-572, (1980).

Gotro, J. et al., "Thermosets", Encyclopedia of Polymer Science and Technology, vol. 12, pp. 207-260, John Wiley & Sons, (2004).

Blaiszik, B.J. et al., "Nanocapsules for self-healing materials", Composites Science and Technology, vol. 68, pp. 978-986, (2008).

Gschwander, S. et al., "Micro-encapsulated paraffin in phase-change slurries", Solar Energy Materials & Solar Cells, vol. 89, pp. 307-315, (2005).

Rao, Y. et al.,"Preparation and thermal properties of microencapsulated phase change material for enhancing fluid flow heat transfer", Heat Transfer—Asian Research, vol. 36, No. 1, pp. 28-37, (2007), originally published in 2005.

Wei, L. et al., "Preparation and characterization of microencapsulated phase change material with low remnant formaldehyde content", Materials Chemistry and Physics, vol. 106, pp. 437-442, (2007).

Cayre, O.J. et al., "Fabrication of novel colloidosome microcapsules with gelled aqueous cores", Journal of Materials Chemistry, vol. 14, pp. 3351-3355, (2004).

Dinsmore, A.D. et al., "Colloidosomes: Selectivery permeable capsules composed of colloidal particles", Science, vol. 298, pp. 1006-1009, (2002).

Croll, L.M. et al., "Composite tectocapsules via the self-assembly of functionalized poly(divinylbenzene) microspheres", Pure Appl. Chemistry, vol. 76, No. 7-8, pp. 1365-1374, (2004).

Utada, A.S. et al., "Monodisperse double emulsions generated from a microcapillary device", Science, vol. 308, pp. 537-541, (2005).

Shin, Y. et al., "Development of thermoregulating textile materials with microencapsulated phase change materials (PCM). II. Preparation and application of PCM Microcapsules", Journal of Applied Polymer Science, vol. 96, pp. 2005-2010, (2005).

Arshady, R., "Preparation of microspheres and microcapsules by interfacial polycondensation techniques", Journal of Microencapsulation, vol. 6, issue 1, pp. 13-28, (1989).

Mayya, K.S. et al., "Micro-encapsulation by complex coacervation: influence of surfactant", Polymer International, vol. 52, pp. 644-647, (2003).

Karukstis, K.K. et al., "Chemistry Connections: The chemical basis of everyday phenomena", Academic Press, second edition, p. 88, (2003).

* cited by examiner

WAX PARTICLES FOR PROTECTION OF ACTIVATORS, AND MULTIFUNCTIONAL AUTONOMICALLY HEALING COMPOSITE MATERIALS

FEDERALLY SPONSORED RESEARCH OR DEVELOPMENT

The subject matter of this application may in part have been funded by the Air Force (AFOSR Grant no. F49620-03-1-0179). The government may have certain rights in this invention.

BACKGROUND

Cracks that form within polymeric composites can be difficult to detect and almost impossible to repair. A successful method of autonomically repairing cracks which has the potential for significantly increasing the longevity of the material has been described in U.S. Pat. No. 6,518,330, as well as in publications.[1-5] This self-healing system includes a material containing, for example, solid particles of Grubbs' catalyst and capsules containing liquid dicyclopentadiene (DCPD) embedded in an epoxy matrix (FIG. 1A). When a crack propagates through the material, it ruptures the microcapsules and releases DCPD into the crack plane. The DCPD then mixes with the Grubbs' catalyst, undergoes Ring Opening Metathesis Polymerization (ROMP), and cures to provide structural continuity where the crack had been.

This system performs well with a relatively large (2.5 wt %) loading of catalyst, but multiple factors have made lower catalyst loadings less effective. First, the catalyst does not disperse well in the epoxy, so very few (but relatively large) catalyst particles are present on the crack plane when low catalyst loadings are used. Second, the epoxy's curing agent, diethylenetriamine (DETA), destructively attacks Grubbs' catalyst.[2] A system where the catalyst is distributed better, and without exposing it to DETA, would allow more efficient use of the catalyst.

BRIEF SUMMARY

In a first aspect, the present invention is a composite material, comprising (i) a polymer, (ii) a polymerizer, (iii) a protected corresponding activator for the polymerizer, and (iv) a plurality of capsules. The polymerizer is in the capsules, and the corresponding activator is protected with a corresponding encapsulant for the polymer and the polymerizer.

In a second aspect, the present invention is a composite material, comprising (i) a polymer, (ii) a polymerizer, (iii) microparticels of a protected corresponding catalyst for the polymerizer, and (iv) a plurality of capsules. The polymerizer is in the capsules, the corresponding catalyst is protected with a corresponding encapsulant for the polymer and the polymerizer, and the encapsulant comprises wax.

In a third aspect, the present invention is particles, comprising (a) a compound, and (b) a wax, surrounding the compound. The particles are microparticles.

Definitions

A polymerizer is a composition that will form a polymer when it comes into contact with a corresponding activator for the polymerizer. Examples of polymerizers include monomers of polymers such as styrene, ethylene, (meth)acrylates, and dicyclopentadiene (DCPD); a monomer of a multi-monomer polymer system such as diols, diamines, and epoxide; and prepolymers such as partially polymerized monomers still capable of further polymerization.

An activator is anything that when contacted or mixed with a polymerizer will form a polymer. Examples of activators are catalysts, initiators, and native activating moieties. A corresponding activator for a polymerizer is an activator that when contacted or mixed with that specific polymerizer will form a polymer.

A catalyst is a compound or moiety that will cause a polymerizable composition to polymerize, and is not always consumed each time it causes polymerization. This is in contrast to initiators and native activating moieties. Examples of catalysts include ring opening polymerization (ROMP) catalysts such as Grubbs catalyst. A corresponding catalyst for a polymerizer is a catalyst that when contacted or mixed with that specific polymerizer will form a polymer.

An initiator is a compound that will cause a polymerizable composition to polymerize, and is always consumed at the time it causes polymerization. Examples of initiators are peroxides (which will form a radical to cause polymerization of an unsaturated monomer); a monomer of a multi-monomer polymer system such as diols, diamines, and epoxide; and amines (which will form a polymer with an epoxide). A corresponding initiator for a polymerizer is an initiator that when contacted or mixed with that specific polymerizer will form a polymer.

A native activating moiety is a moiety of a polymer that when mixed or contacted with a polymerizer will form a polymer, and is always consumed at the time it causes polymerization. Examples of a native activating moiety include an amine moiety (which will form a polymer with an epoxide).

A water-deactivatible activator, water-deactivatible catalyst, water-deactivatible initiator, and water-deactivatible native activating moiety, are each a type of activator, catalyst, initiator and native activating moiety, respectively, that has a reduced ability to form a polymer from a polymerizer after exposure to moisture or water. Similarly, a water-deactivatible corresponding activator, water-deactivatible corresponding catalyst, water-deactivatible corresponding initiator, and water-deactivatible corresponding native activating moiety, are each a type of corresponding activator, corresponding catalyst, corresponding initiator and corresponding native activating moiety, respectively, that has a reduced ability to form a polymer from a polymerizer after exposure to moisture or water. Examples of water-deactivatible activators include $WCl_6$, $MoCl_5$ and $Et_2AlCl$.

A compound is a molecule that contains at most 100 repeating units. This is in contrast to a polymer, which contains more than 100 repeating units.

A capsule is a hollow closed object having an aspect ratio of 1:1 to 1:10, that may contain a solid, liquid, gas, or combinations thereof. The aspect ratio of an object is the ratio of the shortest axis to the longest axis; these axes need not be perpendicular. A capsule may have any shape that falls within this aspect ratio, such as a sphere, a toroid, or an irregular ameboid shape. The surface of a capsule may have any texture, for example rough or smooth.

An encapsulant is a material that will dissolve in a polymerizer and will protect an activator from reaction with materials used to form a polymer. A corresponding encapsulant for a polymer and for a polymerizer will protect an activator from reaction with materials used to form that specific polymer and will dissolve in that specific polymerizer. Paraffin is an example of an encapsulant. When a compound or polymer is coated with an encasulant, it is referred to as "protected".

A microparticle is a particle with an average diameter of at most 500 micrometers.

BRIEF DESCRIPTION OF THE DRAWINGS

FIG. 2A is a photograph of a sections of epoxy samples cut to ~300 μm thick containing 5 wt % wax microparticles that contain 5 wt % Grubbs' catalyst.

DETAILED DESCRIPTION

Taber and coworkers have shown that Grubbs' catalyst can be incorporated into paraffin wax to protect the catalyst from air.[6] Paraffin wax is insoluble in DETA and soluble in DCPD, so the wax would be expected to protect Grubbs' catalyst from the detrimental effects of DETA while still allowing the catalyst to be active when exposed to DCPD. However, an established method of dispersing the wax-protected catalyst as small particles in the epoxy matrix was not found in the literature. While the patent literature contains several techniques for producing wax spheres, there are no previously reported methods for producing small wax particles containing reagents.[7,8]

The present invention makes use of the discovery that activators that are protected by an encapsulant allows for the used of activators that might not otherwise be possible, since with being protected they would de-activate while the polymer is being formed. Furthermore, when the activator is protected, significantly less is need to produce an otherwise similar self-healing material. These low loading levels may also improve the physical properties of the polymer before any self-healing takes place.

Figure 1A:
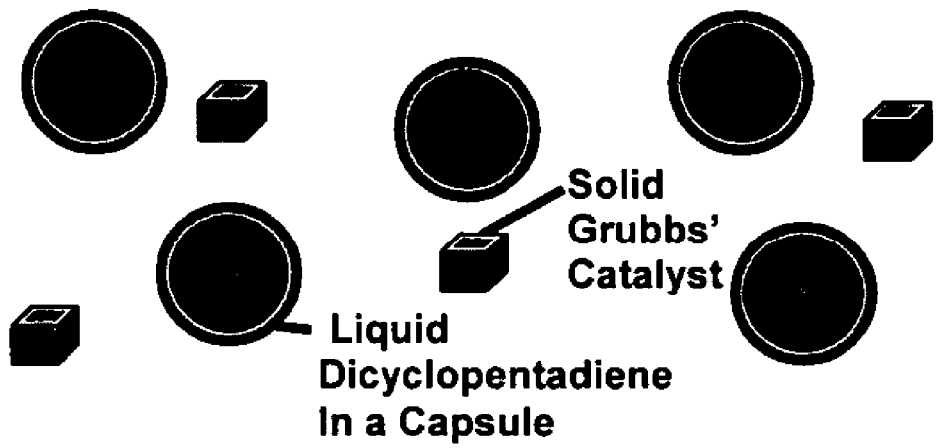
FIG. 1A illustrates a self-healing material using unprotected Grubbs' catalyst.
Figure 1B:
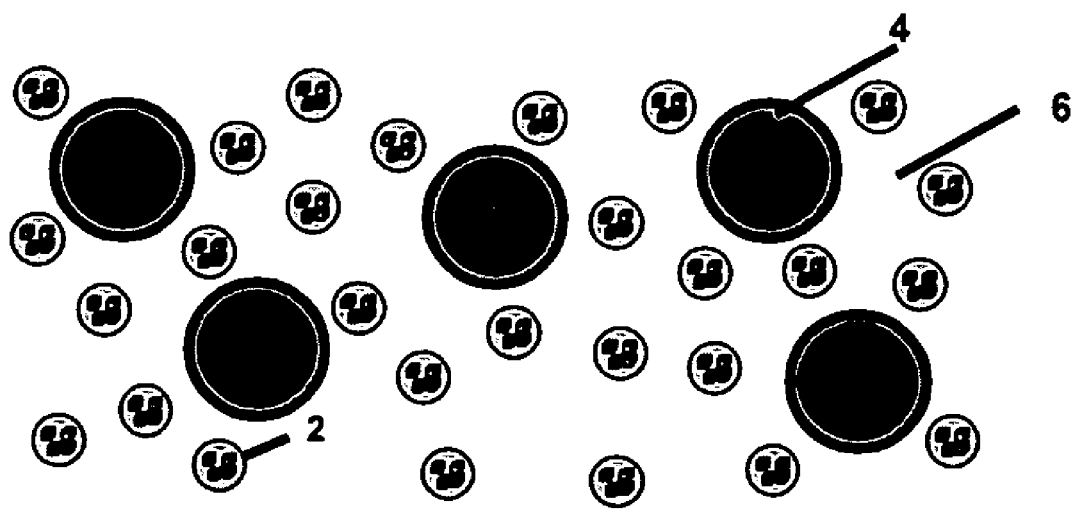
FIG. 1B illustrates a self-healing material with an activator embedded in a microparticle of an encapsulant.

The present invention includes a composite material, containing capsules 4 and a protected activator 2 in a polymer 6, as shown in FIG. 1B. The capsules contain a polymerizer. Preferably, the activator is not a corresponding native activating moiety for the polymerizer, and more preferably the activator is a corresponding initiator, or most preferably a corresponding catalyst, for the polymerizer. The activator is protected by a corresponding encapsulant for the polymer and the polymerizer, and more preferably the encapsulant is a wax.

The composite is the same, or similar, to the composite of U.S. Pat. No. 6,518,330, (incorporated herein by reference), except that the activator is a protected activator. Furthermore, although less preferred, a native activating moiety may also be used as the activator.

The protected activator may be produced by a variety of methods. For example, a liquid containing the encapsulant may be formed, and powder or small particles of the activator may then be dispersed into the liquid. Then the encapsulant is solidified. Particles, preferably microparticles, of the protected activator are formed. It is these particles that are added to the polymer while it is being formed. In this way, the activator is protected from the substances used to form the polymer.

As an example, if the encapsulant can be melted, the activator may be added, and then the system cooled. The solid protected activator may then be ground up to form particles. Similarly, the encapsulant may be dissolved in a solvent to form a solution, mixed with the activator, the solvent removed, and again the solid mixture ground up to form particles. Alternatively, the molten mixture, or solution, may be formed into particles using the methods described in U.S. Pat. No. 6,669,961, incorporated herein by reference.

In another system, the liquid mixture may be poured into a solvent in which both the encapsulant and the activator are insoluble, and then formed into a suspension by rapid stirring; cooling with rapid stirring solidifies the encapsulant, to form particles, more preferably microparticles, of the protected activator. Preferably a surfactant is included.

For example, a wax may be used as the encapsulant, and bis(tricyclohexylphosphine)benzylidene ruthenium (IV) dichloride (first generation Grubbs' catalyst)[9] may be used as the activator. The wax-protected catalyst microparticles may be synthesized by pouring a mixture of the molten wax and into a hot, rapidly-stirred, aqueous solution of poly(ethylene-co-maleic anhydride) (EMA). The resulting suspension of molten wax droplets may then be rapidly cooled with the addition of cold water to solidify the wax. The wax microparticles can be filtered, dried, and sifted to give a coarse powder. When this was carried out, microscopy shows that catalyst particles are suspended in the colorless wax giving the microparticles a speckled appearance, but this heterogeneity was not apparent to the unaided eye.

A model system of wax without Grubbs' catalyst shows that the average size of the microparticles can be easily controlled by the rate of stirring. For example, with stirring rates of 450, 900, and 1500 RPM, the average diameters of collected wax microparticles were 150, 90, and 50 μm, respectively. The size distributions are large, but through the use of sieves, narrower size ranges can be isolated. The EMA is included as a surfactant to facilitate the formation of a suspension. In the absence of EMA, the average particle size is increased by more than a factor of three, and excessive non-spherical wax debris is formed.

If the encapsulant may be formed by the reaction of two or more compounds, such as a polymer, then a solution or liquid containing compounds may be formed, the activator mixed in, and then the reaction of the compounds forms the protected activator. Again, the solid may be ground up to form particles.

The encapsulant is soluble in the polymerizer, and solid at room temperature. Examples of encapsulants are polymers and waxes. Waxes include waxy polymers. Waxes are water insoluble, organic materials that are solid or semi-solid at room temperature and usually of lower density than water, and typically can be melted above room temperature to form a liquid. Preferred waxes include any naturally occurring and synthetic waxes, wax esters, and greases that generally have a melting temperature of 30° C. or more with a melting range of less than 10° C. and are usually non-reactive with the reagents or solvents to which they are exposed. Examples of waxes are esters of various long-chain (fatty) alcohols and long-chain acids, preferably where at least one member of the ester has 10 or more carbon atoms, including various unsaturated and branched chain types and also those esters of glycerols and sterols. Also, certain free alcohols or acids have wax-like properties of melting temperature and inertness. Examples of saturated fatty acids that can be used are capric, lauric, myristic, palmitic, margaric, stearic, arachidic, behenic, tetracosanic, lignoceric, cerotic, and melissic. Some examples of unsaturated fatty acids that can be used are tiglic, hypogaeic, gaidic, physetoleic, elaidic, oleic, isooleic, erudic, brassidic, and isoerudic. Some examples of fatty alcohols that can be used are octadecyl, carnaubyl, ceryl, melissyl, and phytol. Also included are various esters of these and other fatty acids with any suitable fatty alcohols, or sterols such as cholesterol, or glycerols. Other examples are natural or suitably modified or derivatized waxes such as various plant derived waxes, greases and oils including carnauba wax, cranberry wax, ouricuri wax, candelilla wax, raphia wax, apple, cotton and cactus waxes; waxes (including greases) produced by bacteria (e.g. cetyl stearate); fungi, protozoa and algae; various invertebrate waxes and greases including insect waxes such as beeswaxes (e.g. triacontyl palmitate, palmatyl palmitate), and *Coccus* sp. derived waxes (e.g. lac, cochineal and Chinese insect); other animal fats (e.g. triglycerides) and waxes including spermaceti (e.g. cetyl palmitate), lanolin and wool grease.

Also included are various derivatives, extracts, and combinations of these materials. Other suitable waxes are many natural or synthetic hydrocarbons such as white waxes, paraffins, ceresins, vaselines, silicon greases and waxes, polychlorinated or polyfluorinated hydrocarbons, aromatic hydrocarbons (such as naphthalene and durene(1,2,4,5-tetramethylbenzene)), polyether waxes and polyester waxes. Waxy polymers are polymers that have wax-like chemical or physical properties alone or when combined with other waxes. Examples of wax-like polymers are polyethylenes and polypropylenes. Examples of polymers that may be combined with waxes to produce waxy polymers are certain gums and rubbers, various kinds of latex, gutta-percha, balata, chicle and various derivatives. Also included are synthetic rubbers such as isoprene polymers, hydrogenated rubber, butadiene polymers, chloroprene polymers and butyl polymers.

The table below lists examples of encapsulants.

| | | |
|---|---|---|
| Paraffin wax | Gelatin | Carboxymethyl cellulose |
| Ceresine wax | Guar gum | Ethyl cellulose |
| Beeswax | Acacia (gum arabic) | Methyl cellulose |
| Microcrystalline wax | Carob bean gum | Cellulose acetate |
| Petroleum wax | Carrageenan | Cellulose nitrate |
| | Xanthan gum | |
| | Food starch | |
| Silcone rubber | Polyurethane | Polyethylene glycol |
| Butyl rubber | Epoxy | Polystyrene |
| Butadiene-styrene rubber | Polyvinyl alcohol | Polymethyl methacrylate |
| | Polyvinyl acetate | Polypropylene |
| | Polydimethyl siloxane | Polyvinyl chloride |
| | Urea formaldehyde | Polyvinyl alcohol |
| | Polyethylene | Polycarbonate |
| | | Polyamide |

The term "soluble" as used herein, particularly in the case of waxy polymers, also includes swellable; i.e. the polymerizer need not actually dissolve the wax, as long as it can penetrate the encapsulant sufficiently to allow polymerization of the polymerizer when it contacts the activator.

The capsules contain a polymerizer. The polymerizer contains a polymerizable compound such as a monomer or prepolymer, and may optionally contain other ingredients, such as other monomers and/or prepolymers, stabilizers, solvents, viscosity modifiers such as polymers, odorants, colorant and dyes, blowing agents, antioxidants, and co-catalysts. Preferably, the polymerizer is a liquid at room temperatue.

Preferably, the activator is a catalyst or an initiator. Examples of polymerizable compounds are cyclic olefins, preferably containing 4-50 carbon atoms and optionally containing heteratoms, such as DCPD, substituted DCPDs, norbornene, substituted norbornene, cyclooctadiene, and substituted cyclooctadiene. Corresponding catalysts for these are ring opening metathesis polymerization (ROMP) catalysts such as Schrock catalysts[14, 15].

Another example of polymerizable compounds are lactones such as caprolactone, and lactams, that when polymerized will form polyesters and nylons, respectively. Corresponding catalysts for these are cyclic ester polymerization catalysts and cyclic amide polymerization catalysts, such as scandium triflate.

Furthermore, a polymerizer may contain a polymerizable compound and one part of a two-part catalyst, with a corresponding initiator being the other part of the two-part catalyst. For example, the polymerizable compound may be a cyclic olefin; one part of a two-part catalyst may be a tungsten compound, such as an organoammonium tungstate, an organoarsonium tungstate, or an organophosphonium tungstate; or a molybdenum compound, such as organoammonium molybdate, an organoarsonium molybdate, or an organophosphonium molybdate. The second part of the two-part catalyst may be an alkyl aluminum compound, such as an alkoxyalkylaluminum halide, an aryloxyalkylaluminum halide, or a metaloxyalkylaluminum halide in which the metal in the compound is tin, lead, or aluminum; or an organic tin compound, such as a tetraalkyltin, a trialkyltin hydride, or a triaryltin hydride.

In another such system, the polymerizable compound may be unsaturated compounds such as acrylates; acrylic acids; alkyl acrylates; alkyl acrylic acids; styrenes; isoprene; and butadiene. In this case, atom transfer radical polymerization (ATRP) may be used, with one of the two components being mixed with the polymerizable compound and the other acting as the initiator: one component being an organohalide such as 1-chloro-1-phenylethane, and the other component could be a copper(I) source such as copper(I) bipyridyl complex. Alternatively, one component could be a peroxide such as benzoyl peroxide, and the other component could be a nitroxo precursor such as 2,2,6,6-tetramethylpiperidinyl-1-oxy (TEMPO). These systems are described in Malcolm P. Stevens; *Polymer Chemistry: An Introduction,* 3rd Edition; New York: Oxford University Press, 1999, p. 184-186.

In another such system, the polymerizable compound may contain isocyanate functional groups (—N═C═O) with hydroxyl functional groups (—OH). For this system, the polymerizable material may for example be a compound containing both an isocyanate group and a hydroxyl group, or two different compounds, one compound containing at least two isocyanate groups and the other compound containing at least two hydroxyl groups. The reaction between an isocyanate group and a hydroxyl group can form a urethane linkage (—N—C(═O)—O—) between the compounds, possibly releasing carbon dioxide. This carbon dioxide can provide for the creation of expanded polyurethane foam; optionally the polymerizer may contain a blowing agent, for example a volatile liquid such as dichloromethane. In this case, condensation polymerization may be used, with one of the two components being mixed with the polymerizable compound and the other acting as the initiator: for example, one component could be an alkyltin compound such as stannous 2-ethylhexanoate, and the other component could be a tertiary amine such as diazabicyclo[2.2.2]octane (DABCO). These systems are described in Malcolm P. Stevens; *Polymer Chemistry: An Introduction,* 3rd Edition; New York: Oxford University Press, 1999, p. 378-381.

By using a protected activator, a larger variety of polymerizers and corresponding activators, particularly catalysts, may be used. The table below includes additional polymerizers and corresponding activatiors.

| Monomers | Catalysts |
|---|---|
| Ring Opening Metathesis Polymerization | |
| endo-DCPD | Grubbs' catalysts (particularly |
| exo-DCPD | bis(tricyclohexylphosphine) |
| norbornene | benzylidine ruthenium(IV) chloride and |
| cyclooctene | benzylidene[1,3-bis(2,4,6- |
| cyclooctadiene | trimethylphenyl)-2-imidazolidinylidene] |
| | dichloro(tricyclohexylphosphine) |
| | ruthenium) $RuCl_3 \cdot 3H_2O$ |
| | transition metal compounds (particularly |
| | $WCl_6$, $WClO_4$, $MoCl_5$, and $ReCl_5$) and |
| | either an acetylene cocatalyst (particularly |
| | phenylacetylene and 1-alkynes) or an |
| | organometallic co-catalyst |
| | (particularly $Bu^i_3Al$, $Et_3Al$, $Et_2AlCl$, $EtAlCl_2$, |
| | $Me_4Sn$, $Et_4Sn$, $Bu_4Sn$, $Ph_4Sn$, $Me_2(allyl)_2Si$, |
| | or aluminoxanes) |
| | Schrock catalysts (particularly 2,6- |
| | diisopropylphenylimidoneophylidene |
| | molybdenum (VI) bis(t-butoxide) and 2,6- |
| | Diisopropylphenylimidoneophylidene |
| | molybdenum (VI) bis(hexafluoro-t- |
| | butoxide)) |
| Ziegler-Natta Polymerization | |
| dicylopentadiene | metallocene catalyst (particularly based |
| ethylidenenorbornene | on Zr, Ti, or Hf) with methylaluminoxane |
| hexadiene | |
| 1-decene | |
| vinyl ethers | |
| Cationic Polymerization | |
| alpha-methylstyrene | cation-forming initiator (particularly $H_2O$, |
| vinyl ethers | $Ph_3CCl$, tropylium halides, or $I_2$) with a |
| coumarone | Lewis acid coinitiator (particularly |
| indene | $AlCl_3$, $AlBr_3$, $BF_3$, $TiCl_4$, and $SnCl_4$) |
| | mineral acid (Particularly $H_2SO_4$ and |
| | $H_3PO_4$) |

The polymer contains both capsules and a corresponding activator for the polymerizer. Optionally, a set of capsules may be present that contain one or more additional ingredients, such as stabilizers, solvents, viscosity modifiers such as polymers, odorants, colorant and dyes, blowing agents, anti-oxidants, and co-catalysts.

Preferably, the capsules have an average diameter of 10 nm to 1 mm, more preferably 30-500 μm, most preferably to 50-300 μm. The capsules have an aspect ratio of 1:1 to 1:10, preferably 1:1 to 1:5, more preferably 1:1 to 1:3, and even more preferably 1:1 to 1:2, and most preferably 1:1 to 1:1.5.

The wall thickness of the capsules is preferably 100 nm to 3 μm. The selection of capsule walls thickness depends on the polymer in the composite. For example, capsule walls that are too thick will not rupture when a crack approaches, while capsules with very thin walls will break during processing.

The adhesion between the capsules and the polymer of the composite influences whether the capsules will rupture or debond in the presence of an approaching crack. To promote the adhesion between the polymer and capsule wall, various silane coupling agents may be used. Typically, these are compounds of the formula R—$SiX_3$ Where R is preferably a reactive group $R^1$ separated by a propylene group from silicon, and X is an alkoxy group (preferably methoxy), such as $R^1CH_2CH_2CH_2Si(OCH_3)_3$. Examples include silane coupling agents available from DOW CORNING (with reactive group following the name in parentheses): Z6020 (Diamino); Z6030 (Methacrylate); Z6032 (Styrylamine Cationic); Z6040 (Epoxy); and Z6075 (Vinyl).

To increase the adhesion between the capsules and a polymer in the composite, the capsules may be treated by washing them in a solution of the coupling agent. For example, urea-formaldehyde capsules may be washed in a solution of Silane Z6020 or Z6040 and hexane (1:20 wt.) followed by adding Silane Z6032 to the polymer (1 % wt.).

Capsules may be made by a variety of techniques, and from a variety of materials, such as those described in Microencapsulation: Methods and Industrial Applications Ed. Benita, Simon Marcel Dekker, New York, 1996; Microencapsulation: Processes and Applications Ed. Vandegaer, J. Plenum Press, New York, 1974; and Microcapsule Processing and Technology Kondo, A. Marcel Dekker, New York, 1979. Examples of materials from which the capsules may be made, and the techniques for making them include: urea-formaldehyde, formed by in situ polymerization; gelatin, formed by complex coacervation; polyurea, formed by the reaction of isocyanates with a diamine or a triamine, depending on the degree of crosslinking desired (the extent of crosslinking also determines the brittleness of the capsule);and polyamide, formed by the use of a suitable acid chloride and a water soluble triamine.

The polymer may be any polymeric material into which the capsules may be dispersed. Examples include polyamides such as nylons; polyesters such as poly(ethylene terephthalate) and polycaprolactone; polycarbonates; polyethers such as epoxides; polyimides such as polypyromellitimide (for example KAPTAN); phenol-formaldehyde resins (for example BAKELITE); amine-formaldehyde resins such as a melamine resin; polysulfones; poly(acrylonitrile-butadiene-styrene) (ABS); polyurethanes; polyolefins such as polyethylene, polystyrene, polyacrylonitrile, polyvinyls, polyvinyl chloride, poly(DCPD) and poly(methyl methacrylate); polysilanes such as poly(carborane-siloxane); and polyphosphazenes.

The capsules and protected activator (such as the catalyst or initiator) may be dispersed into the polymer by forming the polymer around the capsules and activator, such as by polymerizing monomer to form the polymer with the capsules and activator mixed into the monomer. Alternatively, the polymer may be first formed, and then the capsules and protected activator mixed in. For example, the polymer may be dissolved in a solvent and the capsules and protected activator mixed into the solution, followed by removal of the solvent. Furthermore, other components may be added to the polymer, such as fibers, fillers, adhesion modifiers, blowing agents, anti-oxidants, colorants and dyes, and fragrances.

EXAMPLES

Synthesis of Wax Microparticles Containing Grubbs' Catalyst.

In an $N_2$-filled glovebox, paraffin wax (Aldrich, 10.0 g, mp=58-62° C.) and Grubbs' Catalyst (Strem, 525 mg) were sealed in a vial. The vial was removed from the glovebox. A solution of water (225 mL), poly(ethylene-co-maleic anhydride) (0.63 g, 0.28 wt %) and octanol (1 drop) was placed in a 1000 mL beaker in an 82° C. water bath and stirred with a mechanical stirrer at 900 RPM. The vial containing the wax and the catalyst was submerged in the same 82° C. water bath. After 10 min, the wax had melted and the aqueous solution had reached 65-70° C. The vial with the molten wax was shaken to disperse the catalyst. The vial was then opened (in air), and the wax was poured into the aqueous solution. After 2 min, cold water (600 mL, 0° C.) was quickly added, and the stirring was stopped. The microparticles were collected by filtration and dried under vacuum.

Kinetics of ROMP Catalyzed by Wax-Protected Grubbs' Catalyst

In an $N_2$-filled glovebox, a stock solution of $PCy_3$ (4.1 mM) in d-8 toluene was prepared. This stock solution was then added to an NMR tube with wax microparticles (140 mg) containing 5 wt % Grubbs' catalyst (0.0085 mmol). A control sample with unprotected Grubbs' catalyst (7.0 mg, 0.0085 mmol) and wax microparticles without included catalyst (133 mg) was prepared using the same stock solution of $PCy_3$ in d-8 toluene. The total weight of each solution was 0.70 g. The samples were capped with septa and removed from the glovebox. Mesitylene (10 µL) was added via syringe as an internal standard. The ROMP kinetics with endo-DCPD were obtained by in situ $^1H$ NMR as described previously.[10]

Fracture Tests

Using the established method,[1,2,11] fracture samples with a tapered double-cantilever beam (TDCB) geometry were prepared containing 10 wt % of 180 µm diameter DCPD-filled microcapsules.[1,2,11] The TDCB geometry, developed by Mostovoy et al.,[12] provided a crack-length-independent measure of strain energy:

$$J_C = \frac{\beta(\alpha P_C)^2}{E} \quad (1)$$

Thus, the geometric term α, the critical fracture load $P_C$, and the term β were the only required measurements. As discussed by Brown et al., it can be experimentally determined that $\alpha = 11.2 \times 10^3$ $m^{-3/2}$ for the TDCB sample geometry.[2,4] The nonlinearity term β was introduced to account for nonlinear elastic behavior of the healed interface prior to crack growth. For fracture of the virgin (linear elastic) material, β is uniquely unity (1); for fracture of the healed materials, β is calculated by dividing the area under the measured load-displacement curve up to the point of crack growth by the area under a linear elastic load displacement curve of the same initial compliance and peak load. Virgin fracture was brittle in all cases and was statistically independent of microparticle size, concentration, or catalyst concentration ($J_C = G_C = 250 \pm 50$ $J/m^2$, $K_{IC} = 0.84 \pm 0.07$ $MPa\, m^{1/2}$).

Healing efficiency was assessed by modifying the protocol established by White et al.[1] TDCB fracture specimens were pin loaded and tested under displacement control, at 5 µm/s displacement rate. Samples were tested to failure, measuring initial compliance and peak load to establish the initial (virgin) strain energy release rate. Load was then removed, and the crack faces were allowed to come in contact. Samples were retested after 24 hours to determine the healed, non-linear strain energy release rate. Crack healing efficiency, η, was defined as the ability to recover strain energy:[13]

$$\eta = \frac{J_{C_{healed}}}{J_{C_{virgin}}} = \beta_{healed}\left(\frac{P_{C_{healed}}}{P_{C_{virgin}}}\right)^2 \quad (2)$$

The reactivity of the wax-embedded catalyst was quantified by using in situ $^1H$ NMR to measure the ROMP kinetics of endo-DCPD in the presence of the microparticles.[10] The rate constant for ROMP of DCPD measured for a sample prepared with Grubbs' catalyst obtained from the wax microparticles was 0.0162 $s^{-1}$. An analogous control sample prepared with unprotected Grubbs' catalyst had a rate constant of 0.0179 $s^{-1}$, which shows that the process of embedding the catalyst in wax microparticles only reduces the reactivity by 9%. This small reduction in rate shows that the brief exposure of the catalyst to heat and air only mildly affects its reactivity. Furthermore, when the wax-protected catalyst is melted and cast into new microparticles, the measured rate constant does not change significantly from that of the original microparticles. Because this recycling process can be done without loss of reactivity, microparticles that fall outside the desired size range can be reformed with useful diameters, thus avoiding the costly waste of catalyst.

The wax greatly increases the resistance of the catalyst to ethylenediamine (EDA). As a control, a sample of unprotected Grubbs' catalyst was exposed to neat EDA and immediately placed under vacuum. Within 10 min, the EDA had completely evaporated. The same procedure was performed with wax-protected catalyst microparticles. NMR samples were prepared using the non-volatile catalyst and wax residues, and the kinetics of ROMP of DCPD using the exposed catalyst were measured. The wax preserved 69% of the catalyst's reactivity while the unprotected catalyst showed no reactivity. Because of its low volatility, DETA could not be used in a similar experiment, but the wax appears to similarly protect the catalyst from DETA. Because the wax can protect the catalyst from the DETA used to prepare self-healing samples, less catalyst will be destroyed during sample preparation and healing should be possible with reduced catalyst loadings.

Figure 2A:
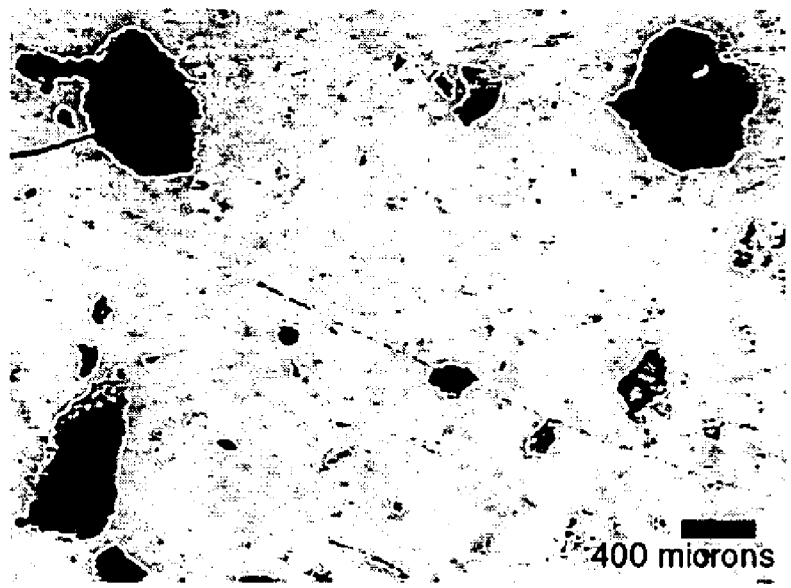
FIG. 2A is a photograph of a sections of epoxy samples cut to ~300 μm thick containing 2.5 wt % unprotected Grubbs' catalyst.
Figure 2B:
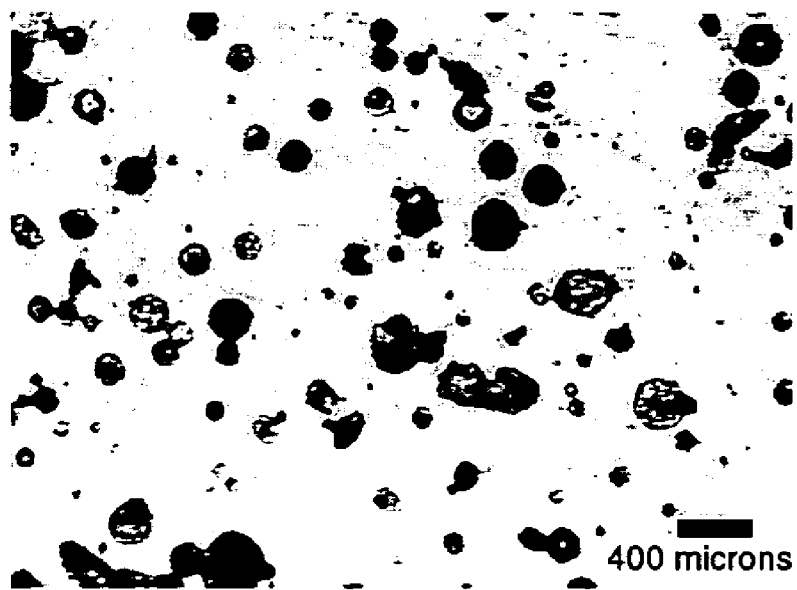

The wax microparticles also appear to be useful for dispersing Grubbs' catalyst uniformly throughout the epoxy matrix. FIG. 2A shows a sample of epoxy containing unprotected catalyst (2.5 wt %), and the micrograph shows that the catalyst tends to form rather large particles with relatively large separations. FIG. 2B shows a similar sample with 5 wt % wax microparticles. However, because the microparticles contain only 5 wt % Grubbs' catalyst, the sample has only 0.25 wt % overall loading of Grubbs' catalyst, which is an order of magnitiude lower than the sample in FIG. 2A. As FIG. 2B shows, the wax microparticles are well distributed throughout the sample giving a much higher sectional density of catalyst particles even with a much lower overall catalyst loading. Thus, the catalyst will also be more evenly distributed across the crack plane of a fractured sample, and this uniformity facilitates healing by delivering catalyst to the DCPD on the entire crack plane rather than only to localized areas near scarce catalyst particles.

Figure 3A:
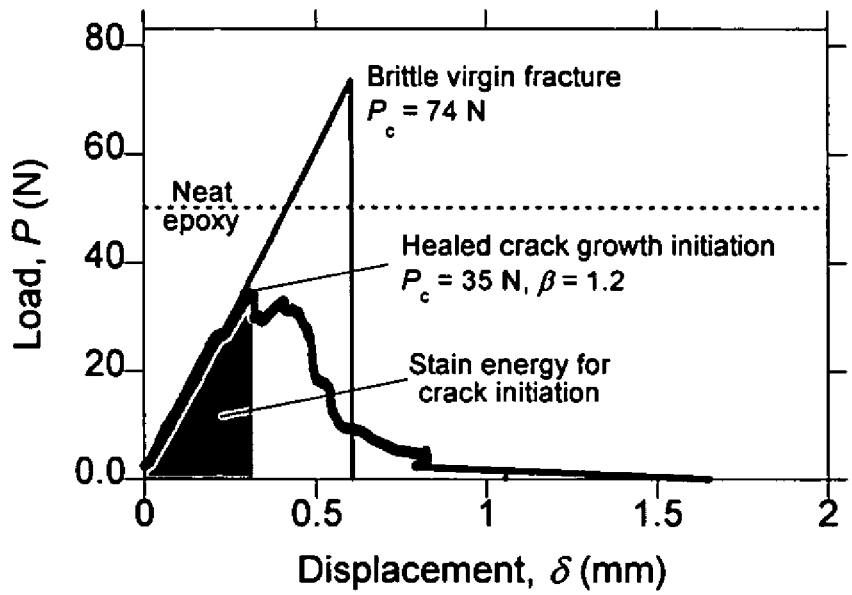
FIGS. 3A and 3B illustrate a virgin and a healed load-displacement curves for the cases of (A) low and (B) high non-linearity of the healed crack growth, 1 wt % of microparticles containing 25 wt % catalyst and 5 wt % of microparticles containing 5 wt % catalyst, respectively.
Figure 3B:
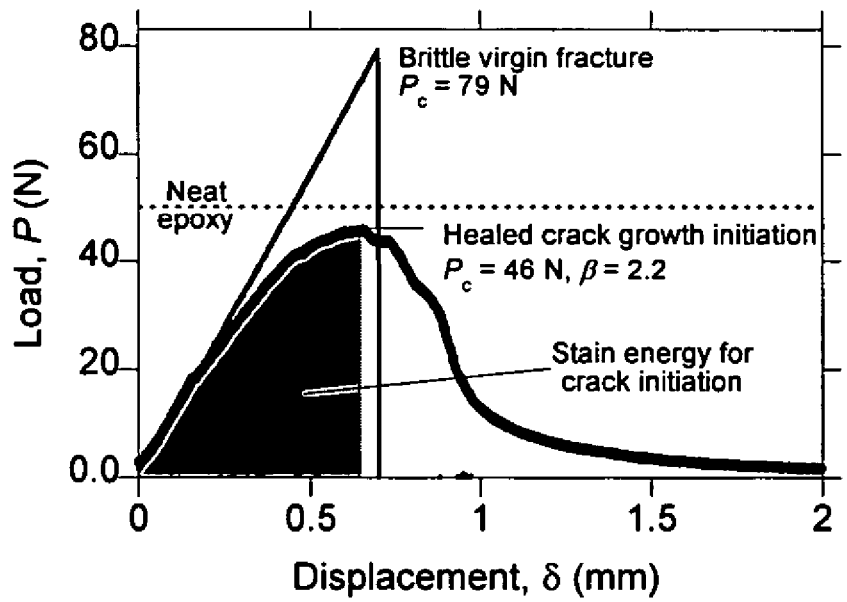

Using the techniques reported previously,[1,2,4] fracture samples were prepared and tested with 10 wt % DCPD microcapsules and various loadings of catalyst microparticles. Representative load-displacement curves for virgin and healed specimens are shown in FIGS. 3A and 3B. Unlike the behavior previously reported for self-healing samples prepared with unprotected catalyst, the self-healing achieved with catalyst microparticles exhibits non-linear behavior prior to the onset of crack propagation. The non-linearity appears to result from the polydicyclopentadiene being softened by the wax that is dissolved in the DCPD prior to curing, and this softening effect is being examined in more detail in a separate study. Due to this non-linearity, strain energy ($J_C$) at crack propagation is a better measure of healing ability than stress intensity ($K_{IC}$) at fracture (which was used in our previous reports), and the healed critical strain energy is dependent on both the critical load for the crack to propagate ($P_C$) and the extent of non-linearity captured by the parameter β; increasing either of these terms increases healing. Moreover, while healing efficiency is a measure of recovery of the strain energy prior to crack propagation, the greater resistance to crack growth in the healed material after the start of propagation yields a total energy to sample failure that is greater than the brittle failure of the virgin material. Therefore, the healing efficiencies calculated using critical strain energy may underestimate the full recovery effect of self-healing.

Figure 4A:
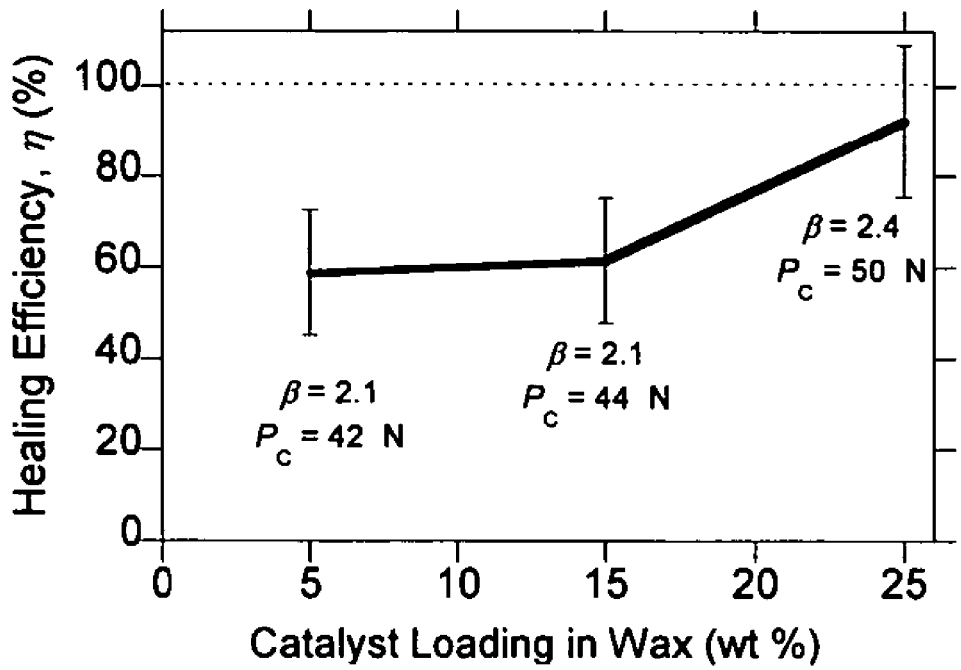
FIGS. 4A and 4B illustrate the dependence of healing efficiency on (A) the amount of catalyst in the microparticles (with 5 wt % microparticle loading in the epoxy) and (B) the way the catalyst loading in the wax and the microparticle loading in the epoxy are balanced to maintain an overall catalyst concentration of 0.25 wt %; each point is the average of three trials, and the error bars indicate±one standard deviation.

FIG. 4A shows how healing efficiencies vary with the amount of catalyst included in the wax microparticles. As expected, the samples with the largest amounts of catalyst gave the best healing efficiencies (93%), but even with the lowest attempted catalyst loading good healing (59%) was observed. In this series, the loading of microparticles in the epoxy is held constant at 5 wt %. If it is assumed that the non-linearity in this system results from wax being incorporated into the polyDCPD, the relatively constant values for β in this series are likely due to the nearly constant amount of wax in each sample.

Figure 4B:
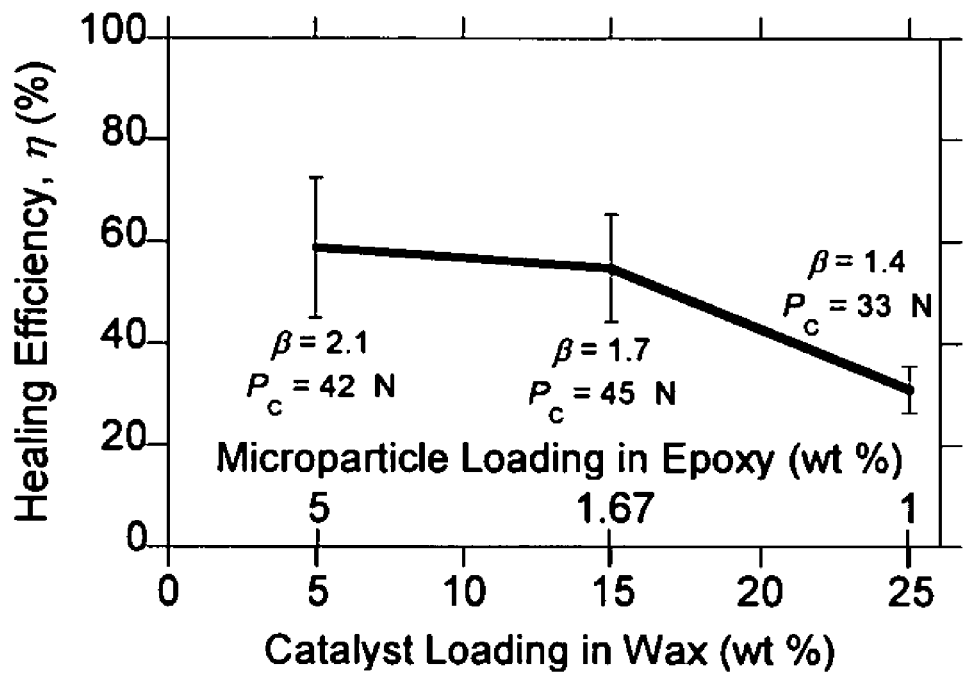

The data in FIG. 4A show that an overall catalyst loading of 0.25 wt % (i.e. 5 wt % catalyst in the microparticles multiplied by 5 wt % microparticles in the epoxy) is sufficient for good healing. Based on this result, an additional series of samples was tested to optimize the healing that can be achieved using this concentration of catalyst. In this series, the loading of catalyst in the wax was varied inversely with the loading of microparticles in the epoxy in order to maintain an overall catalyst level of 0.25 wt % (FIG. 4B). The highest healing efficiency resulted from a 5 wt % catalyst loading in the microparticles and a 5 wt % microparticle loading in the epoxy, and this optimal efficiency is primarily due to the large value for the non-linearity term β. The cause for the high value of β probably stems from the fact that the amount of wax in the sample is at its highest level with 5 wt % microparticles in the epoxy, and high wax loadings appear to enhance non-linearity.

As FIGS. 4A and 4B show, an average healing efficiency of 59% is obtained with a 0.25 wt % catalyst in the sample. As previously reported,[4] the self-healing system using unprotected catalyst gave an optimized average healing efficiency of 62% (based on strain energy $J_C$) and only 24% for the comparable case of 10 wt % 180 μm diameter microcapsules with 2.5 wt % catalyst. Thus, by using the wax protected catalyst microparticles, comparable or, in some cases, superior healing efficiency is achieved while reducing the overall catalyst loading by an order of magnitude.

Suspending Grubbs' catalyst in wax microparticles retains its reactivity while it is protected from the conditions required for the preparation and curing of epoxy materials. This method of delivery produces comparable healing efficiencies to those previously achieved while requiring only one tenth as much catalyst. Additionally, healing efficiencies of 93% (which surpass any previously reported healing efficiencies when expressed in terms of strain energy) can be achieved with this system while using lower catalyst loadings than the previous systems. This increased efficiency may result from more uniform dispersion of the wax-protected catalyst in the epoxy matrix along with the ability of the wax to protect the catalyst from detrimental interaction with DETA. These results may be extended to other polymers, and other protected activators.

REFERENCES

[1] White, S. R.; Sottos, N. R.; Geubelle, P. H.; Moore, J. S.; Kessler, M. R.; Sriram, S. R.; Brown, E. N.; Viswanathan, S. *Nature* 2001, 409, 794-797.
[2] Brown, E. N.; Sottos, N. R.; White, S. R. *Exp. Mech.* 2002, 42, 372-379.
[3] Kessler, M. R.; White, S. R. *J. Polym. Sci. Pol. Chem.* 2002, 40, 2373-2383.
[4] Brown, E. N.; White, S. R.; Sottos, N. R. *J. Mater. Sci.* 2004, 39, 1703-1710.
[5] Kessler, M. R.; Sottos, N. R.; White, S. R. *Compos. Part A-Appl. S.* 2003, 34, 743-753.
[6] Taber, D. F.; Frankowski, K. J. *J. Org. Chem.* 2003, 68, 6047-6048.
[7] Kosak, et al., U. S. Pat, Nos. 5,413,924; 5,550,044; and 5,643,764.
[8] Shimandle, D. J.: U. S. Pat. No. 5,185,108.
[9] Schwab, P.; Grubbs, R. H.; Ziller, J. W. *J. Am. Chem. Soc.* 1996, 118, 100-110.
[10] Rule, J. D.; Moore, J. S. *Macromolecules* 2002, 35, 7878-7882.
[11] Brown, E. N.; Kessler, M. R.; Sottos, N. R.; White, S. R. *J. Microencapsul.* 2003, 20, 719-730.
[12] Mostovoy, S.; Crosley, P. B.; Ripling, E. J. *J. Mater. Sci.* 1967, 2, 661-681.
[13] Wool, R. P.; O'Conner, K. M. *J. Appl. Phys.* 1981, 52, 5953-5963.
[14] Bazan, G.C.; Schrock, R.R.; Cho, H.-N.; Gibson, V.C. *Macromolecules* 1991, 24, 4495-4502.)
[15] Grubbs, R.H.; Chang, S. *Tetrahedron* 1998, 54, 4413-4450.

The invention claimed is:

1. A composite material, comprising:
(i) a polymer,
(ii) a polymerizer,
(iii) microparticles of a protected activator for the polymerizer, and
(iv) a plurality of capsules;
wherein the polymerizer is in the capsules and comprises DCPD,
the polymer comprises epoxy,
the protected activator for the polymerizer comprises a ROMP catalyst protected by a paraffin wax that is soluble in the polymerizer,
the capsules have an aspect ratio of 1:1 to 1:1.5, and an average diameter of 30-300 μm, and
the capsules comprise a polymer of urea and formaldehyde.

2. A method for making the composite of claim 1, comprising:
dispersing the capsules and the microparticles of the protected activator into the polymer.

3. The method of claim 2, further comprising forming the microparticles, where the forming comprises
adding a molten mixture, comprising the wax and the activator, to an aqueous solution to form a suspension, the aqueous solution comprising a surfactant, and
cooling the suspension to solidify the wax mixture into the microparticles of the protected activator.

* * * * *